(12) United States Patent
Sharp et al.

(10) Patent No.: US 9,530,397 B2
(45) Date of Patent: Dec. 27, 2016

(54) LIGHT EFFICIENT ACOUSTICALLY TRANSMISSIVE FRONT PROJECTION SCREENS

(71) Applicant: RealD Inc., Beverly Hills, CA (US)

(72) Inventors: Gary D. Sharp, Boulder, CO (US); David A. Coleman, Louisville, CO (US)

(73) Assignee: RealD Inc., Beverly Hills, CA (US)

( * ) Notice: Subject to any disclaimer, the term of this patent is extended or adjusted under 35 U.S.C. 154(b) by 84 days.

(21) Appl. No.: 13/786,092

(22) Filed: Mar. 5, 2013

(65) Prior Publication Data

US 2013/0233641 A1 Sep. 12, 2013

Related U.S. Application Data

(60) Provisional application No. 61/607,331, filed on Mar. 6, 2012.

(51) Int. Cl.
| | | |
|---|---|---|
| G10K 11/18 | (2006.01) |
| G03B 21/60 | (2014.01) |
| G03B 21/56 | (2006.01) |
| B23K 26/36 | (2014.01) |
| G02B 27/26 | (2006.01) |

(52) U.S. Cl.
CPC ............. *G10K 11/18* (2013.01); *B23K 26/36* (2013.01); *G02B 27/26* (2013.01); *G03B 21/56* (2013.01); *G03B 21/565* (2013.01); *G03B 21/60* (2013.01)

(58) Field of Classification Search
CPC ........ G02B 27/26; G03B 21/60; G03B 21/565
USPC .. 181/175; 359/449, 459, 445, 444; 264/400
See application file for complete search history.

(56) References Cited

U.S. PATENT DOCUMENTS

| | | | | |
|---|---|---|---|---|
| 2,216,901 A | * | 10/1940 | Bodde | G03B 21/565 359/445 |
| 2,238,365 A | * | 4/1941 | Hurley | G03B 21/565 359/445 |
| 2,245,896 A | * | 6/1941 | Bodde | G03B 21/565 264/309 |

(Continued)

FOREIGN PATENT DOCUMENTS

| | | |
|---|---|---|
| CN | 202486493 U | 10/2012 |
| JP | 2010210778 A * | 9/2010 |

(Continued)

OTHER PUBLICATIONS

International search report and written opinion of international searching authority in PCT/US13/29169 dated Jun. 27, 2013.

(Continued)

*Primary Examiner* — David Warren
*Assistant Examiner* — Christina Schreiber
(74) *Attorney, Agent, or Firm* — Penny L. Lowry; Neil G. J. Mothew

(57) ABSTRACT

A front projection screen is provided having a first portion of material and a second portion of material. The first and second portions of material may have an undercut edge profile, and the first and second portions of material may be perforated, such that the perforations allow the first and second portions of material to be at least somewhat acoustically transmissive while substantially maintaining optical efficiency from the front side of the front projection screen. Such optical efficiency has particular utility in stereoscopic projection applications utilizing polarized encoded light.

22 Claims, 14 Drawing Sheets

(56) References Cited

U.S. PATENT DOCUMENTS

| | | | | | |
|---|---|---|---|---|---|
| 4,057,323 | A | * | 11/1977 | Ward, Jr. | E04B 1/3211 156/258 |
| 5,007,707 | A | * | 4/1991 | Bertagni | G03B 21/565 352/36 |
| 6,335,829 | B1 | * | 1/2002 | Van De Voorde | H04N 9/3147 348/E5.144 |
| 6,552,847 | B2 | * | 4/2003 | Congard | G03B 21/58 359/444 |
| 6,829,086 | B1 | * | 12/2004 | Gibilini | G03B 21/625 359/453 |
| 7,106,411 | B2 | * | 9/2006 | Read | E04H 3/22 352/40 |
| 7,262,912 | B2 | * | 8/2007 | Wood | G03B 21/602 359/443 |
| 8,021,714 | B2 | * | 9/2011 | Peterson | G03B 21/602 427/163.3 |
| 8,408,775 | B1 | * | 4/2013 | Coleman | G02F 1/133526 362/602 |
| 8,526,106 | B2 | * | 9/2013 | Coleman | G03B 21/604 359/443 |
| 8,567,953 | B2 | * | 10/2013 | O'Dor | H04N 9/3147 250/205 |
| 2002/0048729 | A1 | * | 4/2002 | Nishikawa | G02B 3/0018 430/321 |
| 2002/0051289 | A1 | * | 5/2002 | Congard | G03B 21/565 359/443 |
| 2003/0156264 | A1 | * | 8/2003 | Honda | G03B 21/22 353/74 |
| 2006/0061861 | A1 | * | 3/2006 | Munro | G03B 21/625 359/456 |
| 2007/0228927 | A1 | * | 10/2007 | Kindler | G03B 21/56 313/495 |
| 2008/0094705 | A1 | * | 4/2008 | Burkum | G03B 21/60 359/487.05 |
| 2009/0190210 | A1 | * | 7/2009 | Coleman | G02B 27/26 359/452 |
| 2009/0297797 | A1 | * | 12/2009 | Coleman | G02B 27/26 428/195.1 |
| 2010/0053748 | A1 | * | 3/2010 | Rohner | G03B 21/62 359/460 |
| 2010/0188746 | A1 | * | 7/2010 | Coleman | G02B 27/26 359/459 |
| 2011/0157695 | A1 | * | 6/2011 | Katsenelenson | G03B 21/56 359/449 |
| 2012/0113508 | A1 | * | 5/2012 | Coleman | G02B 27/26 359/459 |
| 2012/0229894 | A1 | * | 9/2012 | Coleman | G03B 21/604 359/443 |
| 2012/0237675 | A1 | * | 9/2012 | Sharp | B29D 11/0074 427/163.3 |
| 2012/0250150 | A1 | * | 10/2012 | Katsenelenson | G03B 21/56 359/449 |
| 2012/0282425 | A1 | * | 11/2012 | Gallagher | A41D 27/245 428/61 |
| 2013/0017371 | A1 | * | 1/2013 | Kondo | G03B 21/56 428/189 |

FOREIGN PATENT DOCUMENTS

| | | | |
|---|---|---|---|
| JP | 2011128604 A | * | 6/2011 |
| KR | 20110046717 A | * | 5/2011 |
| KR | 1020110046717 A | | 5/2011 |
| KR | 20110046717 A | * | 6/2011 |
| WO | 2011020962 A1 | | 2/2011 |
| WO | 2011068907 A1 | | 6/2011 |

OTHER PUBLICATIONS

Campbell, F.W. and Robson, J.G. "Application of Fourier Analysis to the visibility of gratings," J. Physiol (London), 197, pp. 551-566, 1968.

International search report and written opinion of international searching authority in co-pending PCT/US.

Extended European Search Report for European Application No. 13758536.0 dated Feb. 4, 2016.

* cited by examiner

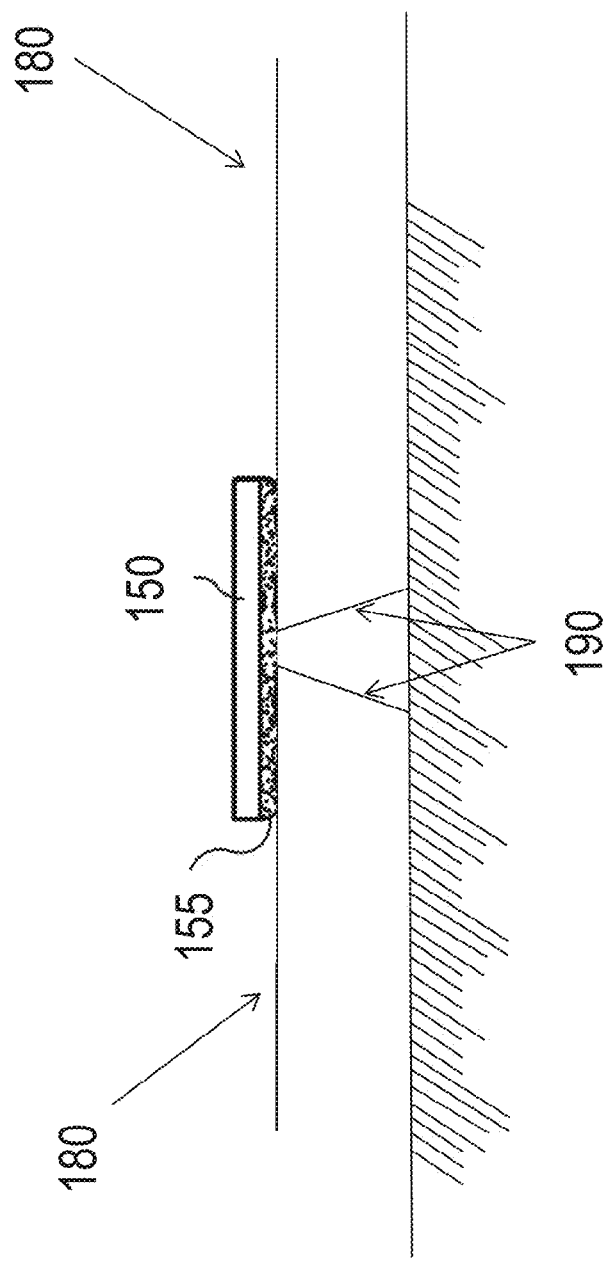

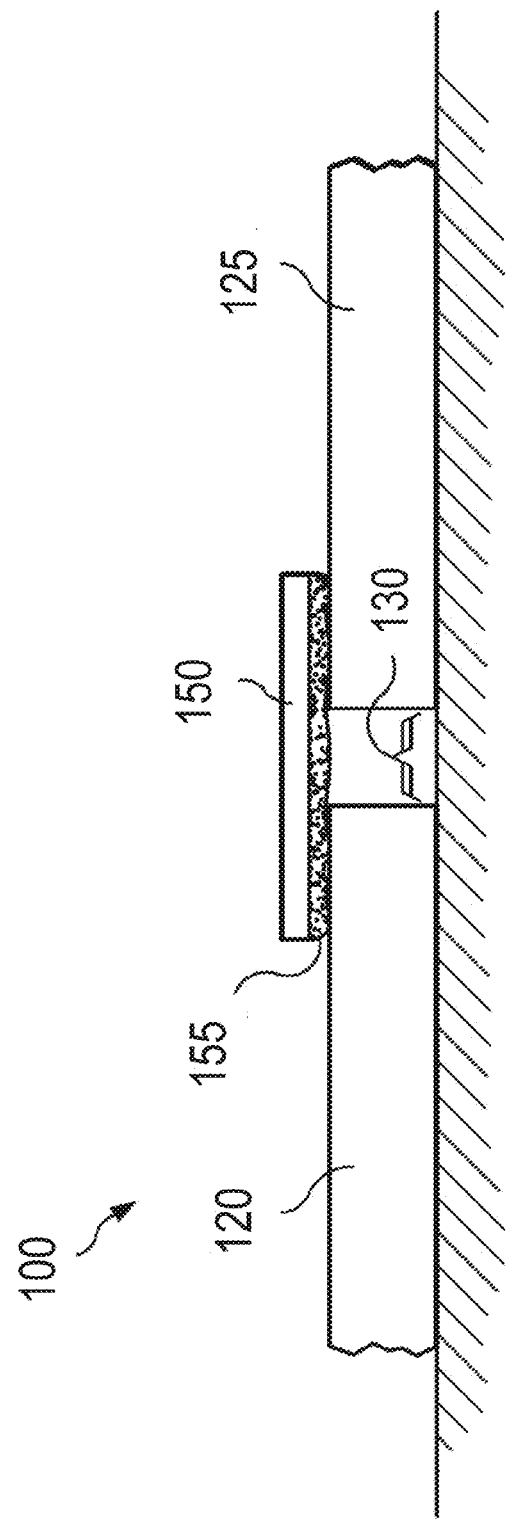

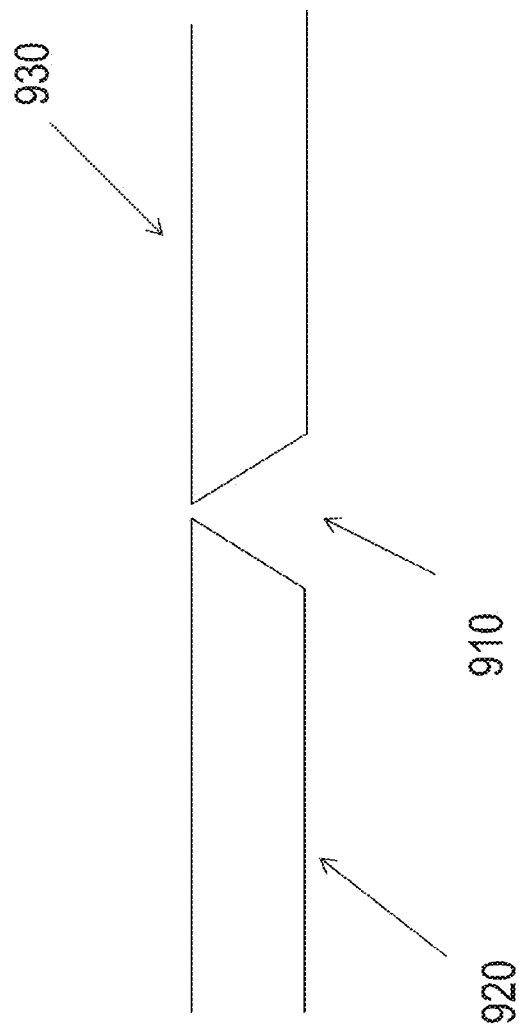

LIGHT EFFICIENT ACOUSTICALLY TRANSMISSIVE FRONT PROJECTION SCREENS

CROSS-REFERENCE TO RELATED APPLICATIONS

This application claims priority to U.S. Provisional Patent Application Ser. No. 61/607,331 filed Mar. 6, 2012, entitled "Method and apparatus for managing optical non-uniformities in seaming processes," the entirety of which is herein incorporated by reference.

TECHNICAL FIELD

The present disclosure generally relates to screens, and more particularly relates to acoustically transmissive front projection screens.

BACKGROUND

Conventional screens are manufactured according to a "coat-after-converting" process. That is, roll stock is converted to full-size by joining vertical strips, one meter or more in width, after which and when appropriate an optically functional coating is applied. In a cinema environment and many home theatre installations, sound systems are often mounted behind the screen, requiring periodic perforations for high frequency transmission. In order to preserve the quality of sound, the screen should have sufficient acoustic transmission that moderate equalization yields an acceptable frequency response.

BRIEF SUMMARY

The present disclosure relates to acoustically transparent or transmissive front projection screens. According to an aspect of the present disclosure, a front projection screen may include a first portion of material and a second portion of material, in which the first and second portions of material may have microperforations less than approximately 300 microns. The microperforations may allow the first and second portions of material to maintain an approximate predetermined acoustical transmission range. The first and second portions of material may have an approximate predetermined optical fill factor. The predetermined optical fill factor may have a perforation area with an approximate area range of 1%-3% of the optical surface of the total area of the first and second portions of material. At least some of the microperforations may have an approximately conical shaped cross section. The perforated first and second portions of material may have a substantially homogeneous appearance. Additionally, each of the first and second portions of material may have a front side and each of the first and second portions of the material may have an undercut edge profile with respect to the front side of the material. The undercut edge profile may be achieved with laser slitting. The first and second portions of material may be joined together to form a seam and also may be joined with little to no machine direction alignment. The microperforations may be in the approximate size range of 50-300 microns on the front surface. The front projection screen may have a pitch pattern on the first and second portions of material, in which the pitch pattern has an increasing pitch between microperforations. The pitch between microperforations may gradually increase from the center of the material to the edge of the material, and the increase in pitch may be substantially visually imperceptible.

According to another aspect of the present disclosure, a method for producing an acoustically transmissive substrate may include perforating a substrate to achieve a predetermined acoustical transmission range for the substrate and to achieve a predetermined optical fill factor for the substrate. The perforations on the substrate may be less than approximately 300 microns. Additionally, perforating may be achieved with laser perforating and the laser perforating may include single shot laser perforating. In one example, the perforations may be located on the substrate in a periodic array. In another example, a first set of perforations may be located on the substrate in a periodic array and a second set of perforations may be located on the substrate randomly. In another example, the perforations may be located on the substrate in a random pattern. In another example, the perforations may be located on the substrate in a partially random pattern. The perforations may be located on the substrate without regard to registration of the perforations with respect to the edge of the substrate. Further, the perforations on the front side of the substrate may be in the approximate size range of 50-300 microns. Additionally, the cross section of the perforations may be approximately conical.

According to yet another aspect of the present disclosure, a front projection screen may include a first portion of material and a second portion of material. The first and second portions of material may have a front side and each of the first and second portions of the material may have an undercut edge profile with respect to the front side of the material. The undercut edge profile may be achieved with laser slitting.

These and other advantages and features of the present invention will become apparent to those of ordinary skill in the art upon reading this disclosure in its entirety.

BRIEF DESCRIPTION OF THE DRAWINGS

FIG. 1D illustrates a schematic diagram of two substrates with undercut slit edges forming a seam, in accordance with the present disclosure;

FIG. 1E illustrates a schematic diagram of two substrate sections forming a gap, in accordance with the present disclosure;

FIG. 9B illustrates a schematic diagram of a cross section of the conical perforation, in accordance with the present disclosure.

DETAILED DESCRIPTION

Figure 1A:
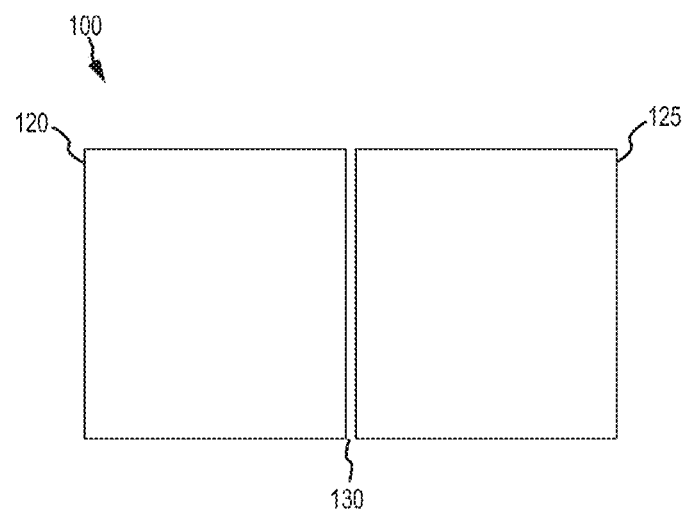
FIG. 1A illustrates a schematic diagram of a two substrate sections forming a gap, in accordance with the present disclosure.

The present disclosure relates to acoustically transparent or transmissive front projection screens. According to an aspect of the present disclosure, a front projection screen may include a first portion of material and a second portion of material, in which the first and second portions of material may have microperforations less than approximately 300 microns. The microperforations may allow the first and second portions of material to maintain an approximate predetermined acoustical transmission range. The first and second portions of material may have an approximate predetermined optical fill factor. The predetermined optical fill factor may have a perforation area with an approximate area range of 1%-3% of the optical surface of the total area of the first and second portions of material. At least some of the microperforations may have an approximately conical shape in a cross section taken approximately perpendicular to the substrate. The perforated first and second portions of material may have a substantially homogeneous appearance. Additionally, each of the first and second portions of material may have a front side and each of the first and second portions of the material may have an undercut edge profile with respect to the front side of the material. The undercut edge profile may be achieved with laser slitting. The first and second portions of material may be joined together to form a seam and also may be joined with little to no machine direction alignment. The microperforations may be in the approximate size range of 50-300 microns on the front surface. The front projection screen may have a pitch pattern on the first and second portions of material, in which the pitch pattern has an increasing pitch between microperforations. The pitch between microperforations may gradually increase from the center of the material to the edge of the material, and the increase in pitch may be substantially visually imperceptible.

According to another aspect of the present disclosure, a method for producing an acoustically transmissive substrate may include perforating a substrate to achieve a predetermined acoustical transmission range for the substrate and to achieve a predetermined optical fill factor for the substrate. The perforations on the substrate may be less than approximately 300 microns. Additionally, perforating may be achieved with laser perforating and the laser perforating may include single shot laser perforating. In one example, the perforations may be located on the substrate in a periodic array. In another example, a first set of perforations may be located on the substrate in a periodic array and a second set of perforations may be located on the substrate randomly. In another example, the perforations may be located on the substrate in a random pattern. In another example, the perforations may be located on the substrate in a partially random pattern. The perforations may be located on the substrate without regard to registration of the perforations with respect to the edge of the substrate. Further, the perforations on the front side of the substrate may be in the approximate size range of 50-300 microns. Additionally, the cross section of the perforations may be approximately conical.

According to yet another aspect of the present disclosure, a front projection screen may include a first portion of material and a second portion of material. The first and second portions of material may have a front side and each of the first and second portions of the material may have an undercut edge profile with respect to the front side of the material. The undercut edge profile may be achieved with laser slitting. Further, the first and second portions of material may be joined to form a seam in which the undercut edges may be adjacent to one another. The seam may be substantially visually imperceptible and may be under a JND (just noticeable difference). Stated differently, there may be an approximately 1% or less than 1% change in reflectance at the seam.

In conventional cinema auditoriums, and many home theatre installations, the speakers are typically positioned behind the projection screen. In order to preserve the quality of sound, the screen should have sufficient acoustic transmission that moderate equalization yields an acceptable frequency response. For most polymer substrate materials of representative thickness, acoustic attenuation is very low (below 1 db) for frequencies below 100 Hz. However, attenuation steadily increases at higher frequencies, for the most part following the "mass-law" for a non-porous homogeneous plate for plane-wave incidence. Normal incidence attenuation for typical cinema screen substrate at 16 kHz is over 30 db.

The issue of substrate acoustic attenuation is typically overcome in cinema by punching an array of holes in the raw substrate prior to seaming/coating. This creates an acoustic short-circuit, allowing sound to diffract toward these regions of virtually zero resistance. A typical perforation hole diameter for a cinema screen is 1.2 mm on a square grid, with a pitch of 4.5 mm. While this reduces the acoustic attenuation to the 7-9 db level at 16 kHz, the holes represent an optical loss of approximately 6%. Moreover, holes of this diameter are resolvable from a distance of more than 5 meters, and in some instances, the periodicity creates moire fringes when used with digital projectors.

From a manufacturing standpoint, perforations are problematic in that they should be co-registered to avoid spatial-averaged intensity variation. That is, the seam shouldn't disrupt the periodicity of the hole distribution, because local average hole density influences screen brightness. When not maintained, such disruptions are easily observable in the audience as brightness variations along the seam. This places demands on the precision of the manufacturing slitting/seaming process.

Alternatively, acoustically transparent fabrics have been manufactured for home theatre screens which are free from the visual artifacts associated with punched holes. This is a viable approach for producing matte screens that are not required to preserve polarization. Preserving polarization in 3D display calls for scattering features that are significantly larger than a wavelength, while also minimizing pseudo-depolarization. The latter refers to two (or more) reflections from the surface, resulting in rays that are locally polarized, but which differ in polarization from the desired rays that have single interactions with the surface. Fabrics are typically statistical surfaces, which are random on a wavelength scale and highly sloped, making such control very challenging.

More recent screen manufacturing approaches leverage as much roll-to-roll processing as possible, with the goal of obtaining optical precision at minimal cost. This is a fundamental change in approach, wherein finished screen roll-stock is produced prior to seaming. Processes such as slitting and perforating are additionally preferably performed in a roll-to-roll environment. Slitting knives are capable of producing edge profiles which are acceptable for producing butt joints that are sufficiently narrow as to not be visible from a cinema audience. Either step-and-repeat die punches, or roll-die punches can be used to produce arrays of holes that are aligned to precision slit edges. However, serious practical manufacturing difficulties can arise on the seaming of such materials.

Recent screen seaming processes involve relatively high modulus substrates, such as biaxially stretched PET, or polycarbonate (PC). Here, finished screen material (coated, slit and perforated) is cut from roll-stock and seamed using a reinforced butt joint (RBJ) bonded with a UV cure adhesive, as generally described in U.S. Provisional Patent Application No. 61/507,574, which is herein incorporated by reference in its entirety. When arrays of conventional macroscopic perforations are used, the in-board location of the perforations with respect to the slit edge should be precisely maintained. The strips should also be co-registered in the machine direction (MD) to ensure uniform appearance. But one of the most challenging processes involves placement of the backer strip between the perforations. A screen with a 4.5 mm hole pitch and a 1.2 mm hole diameter typically uses a backer width less than 3.3 mm, which factoring in tolerances, is typically below 3.0 mm. This typically leaves a ledge of 1.5 mm to bond to on each surface, which may be far too small for adequate mechanical strength with an adhesive process.

An RBJ process can potentially use a backer that is significantly wider than the hole pitch, and simply cover one or more rows of holes. The issue here is that the air-dielectric interface associated with the adhesive creates a substantially specular reflection for light entering the perforation. The adhesive tends to be quasi-flat on the scale of tens of microns with a specular reflection in the 3-4% range. When an observer is in the specular direction of such a feature, the power collected by the eye can be substantially greater than that collected by scatter from the surrounding diffuser. As such, the visual experience may be compromised. One approach is to use an adhesive that is pre-embossed, so that this scatter is randomized, as described in U.S. Provisional Patent Application Ser. No. 61/450,637, which is herein incorporated by reference in its entirety. This is effective, and may not use additional process steps.

An aspect of the present disclosure is the discovery that acceptable acoustic transmission can be achieved with much reduced hole-diameter, without a proportional decrease in pitch. This enables the ideal result of high optical fill factor (e.g., 1% hole area), high acoustic transmission, and few if any visual artifacts. In addition to being highly manufacturable, the present disclosure may provide for a highly manufacturable back-end process for converting screen roll-stock to finished screens. The process of joining strips of finished screen material in such a way that the appearance is substantially homogeneous is challenging. Screen material or substrates with a substantially homogeneous appearance may have a change in reflectivity less than a just noticeable difference. A just noticeable difference may be approximately one percent of the mean intensity. Experiments have shown that the eye can perceive high spatial frequency deterministic features (e.g., sharp lines) to the level of 1% or better. When present, abrupt disruptions in intensity at the seam boundary are made even more noticeable by the fact that they are periodic in nature on the finished screen. Conversely, low spatial frequency variations in intensity are relatively tolerable, in accordance with research results on this topic conducted by Campbell and Robson (see F. W. Campbell and J. G. Robson, *Application of Fourier Analysis to the visibility of gratings,* J. Physiol. (London), 197, pp. 551-566, 1968).

An aspect of the present disclosure is the enabling of a "seam after coating" screen assembly process that is highly manufacturable. Such a process may utilize several alignment critical steps for acceptable screen appearance. Precision slitting may be appropriate for narrow-gap butt joining of strips, with both long-range straightness and substantially flawless edge profiles. The effective gap is the distance between functional diffuser, so it encompasses both the physical separation of the substrate and the loss of functional material due to the slitting process. Beneficial aspects of laser slitting include both the elimination of edge damage/chipping of functional material, as well as the control of edge profile/straightness which allow consistent narrow-gap joining A consistent gap of joined screen material with a separation of approximately 100 microns can be observed in a cinema environment from a reasonable distance. In most circumstances, a gap separation of approximately 50 microns is likely acceptable. A gap may be formed by joining at least a first and second substrate. The substrates may be made of any material including PVC, PC, PET, and so forth. However, when using an RBJ process, it is often preferable to hold tighter control of the gap. As when covering perforations with a backer, the existence of a reflective interface at the backer can cause a spike in intensity that is observable for viewers in the specular direction. However, when the separation is very small relative to the substrate thickness, it becomes very difficult for light to escape after reflection from the backer. This may place the effective gap specification at 10-20 microns, which is likely not consistently achievable with a mechanical slitting process.

Another aspect of the present disclosure that enables screen manufacturing is the perforation profiles that are possible using a laser. The fact that the eye can perceive an abrupt 1% intensity step, coupled with the fact that 5-8% of light is typically lost to perforations, is a justification for precision registration of substrates. Regardless of when screen coating is done, conventional perforations place stringent demands on registration of substrate material, both in the TD (transverse direction) and the MD (machine direction). TD registration entails that the perimeter perforation may be centered at approximately a half-pitch distance from the slit edge. MD registration entails that the slit strips are joined such that the perforations are substantially aligned across the gap. When using an elastic substrate, such as PVC, there is some freedom to adjust this during the joining process. However, with rigid substrates such as PET, there can be virtually no deterministic drift in the pitch that would make MD registration impossible. In general, the existence of macroscopic perforations places challenging demands on the joining process.

According to the present disclosure, the size and pitch of perforations is sufficiently small that MD and TD alignment are not critical, and preferably not even a consideration. In an embodiment, finished screen stock is perforated without regard for registration with respect to a slit edge, which is subsequently unwound from a roll, butted against the build-sheet under fabrication, and seamed without any regard for registration in the MD.

In order to attain high manufacturing throughput (e.g., web speed), high quality (e.g., edge profile and perforation profile), there are critical aspects of the laser that should be identified. For instance, high web speed in the perforation step is preferably a single shot or "one-shot per hole" process, in which a careful balance between power density and thermal management (among other things) may be appropriate. In many instances, it is desirable for both processes to be done with functional material face-down. This is because, when the height of the beam waist is carefully controlled, the most significant substrate damage often occurs at the laser entrance interface. Since some undercut of the substrate wall is performed for consistent gap control, some thermal damage is actually desirable in the slitting process. Thermal damage should of course be minimized on the opposing side, such that there is little to no compromise in the integrity and appearance of the functional diffuser coatings. For instance, increasing the front-side temperature above the glass-transition temperature of the substrate and/or emboss layer can cause delamination, dimensional changes, or reflow of the coating that affects the local diffusion.

Thermal damage is often associated with the perforation process, allowing a conical-shaped hole or a perforation with a conical shaped cross section. However, excessive damage on the back side can cause stress in the film, which affects the "lie-flat" requirement. For instance, substrate resin can reflow producing excess material in the form of a ring, which shrinks upon cooling, causing stress.

In an embodiment, small perforations, for example in the approximate range of 50-300 microns, with acoustically desirable hole profiles are demonstrated to be manufacturable using high web speed laser-based equipment. The perforation or hole profiles may be in the approximate range of 50-300 microns when measured from the front side of the perforated substrate. One example of an acoustically desirable hole profile may be a conical shape. Small perforations in the approximate range of 50-300 microns may also be referred to herein as microperforations. Additionally, microperforations may be any perforation that is less than approximately 300 microns. Perforations of this size substantially eliminate the seaming and perforation registration constraints, in part because there is so little light lost to perforations that such issues are not capable of producing significant intensity variations. Indeed, a 1% hole area screen is manufacturable using the techniques discussed in the present disclosure, which in itself is probably sufficient to eliminate the need for TD and MD registration. Also according to the present disclosure, a further step can be taken to randomize the hole position with the laser scanning mechanism if necessary.

In traditionally manufactured die-punched perforations, the shape of the hole is nominally circular. For laser cut holes, this is an unnecessary constraint. In fact the holes may have an arbitrary shape such that the total area of the perforation remains constant. For example elliptical holes may have an eccentricity of as much as 0.97 without impacting the acoustic transmission. In the present disclosure, hole diameter is intended to be interchangeable with the equivalent hole area for an arbitrarily shaped hole.

According to the present disclosure, hole diameters that are small relative to the substrate thickness produce relatively little observable specular reflections due to the air-adhesive interface in the perforation at the backer. This allows extremely wide backer substrates (maximizing mechanical strength) with relatively imprecise placement. In the event that an observable specular component remains, any method that roughens the surface of the backer adhesive can eliminate the specular component. This can be done, for example, by using a release liner embossed with a micro-topography in a UV PSA adhesive seaming process.

An alternative technique that allows a wide backer is to "feather" the perforation pitch. This is done by changing the rep-rate of the laser pulse during scanning or adjusting scan rate with fixed rep-rate. Again, because there is so little loss due to hole area, the pitch can be gradually increased from center to each edge of a screen strip, with only a small (e.g., 1%) change in intensity. By feathering the pitch, the spatial frequency is reduced to a level where the intensity change is substantially imperceptible.

In conjunction with laser perforation, laser slitting is preferred according to the present disclosure. Laser slitting can provide excellent long-range straightness in the machine direction (MD), and much more consistent edges in terms of edge quality and profile than mechanical slitting, such as slitting with knives, shear slitting, rotary burst, and so forth. Edge quality can be degraded due to defects such as damage to coated material (chipping), local straightness of the substrate cut (knife wobble/wander), statistical uncertainty in substrate fracturing along the MD, substrate cracking along the transverse direction (TD), and debris generated by the cut. Also, the quality of the cut is gradually diminished over time as the knives become dull; which is not an issue with laser slitting. A substantially consistent edge profile is desired, as provided by laser slitting, in which the wall angle may shallower than approximately 90°. This ensures that the coated surfaces can be tightly butted together (versus steeper wall angles where the substrates are tightly butted on the uncoated side of the substrate), forming a gap between optically functional coatings.

FIG. 1A illustrates a schematic diagram of two substrate sections forming a gap. Further, FIG. 1A may form a portion of a screen 100 which may include a first section of substrate 120, and a second section of substrate 125. The two sections of substrate may be joined together as shown in FIG. 1A to form a gap 130. The portion of screen 100 may include more than two pieces of substrate joined together, and the two sections of FIG. 1A are shown for illustrative and explanatory purposes only and not of limitation. The substrate may have a functional material on its surface (not shown in FIG. 1A) and this functional material may be reflective.

Figure 1B:
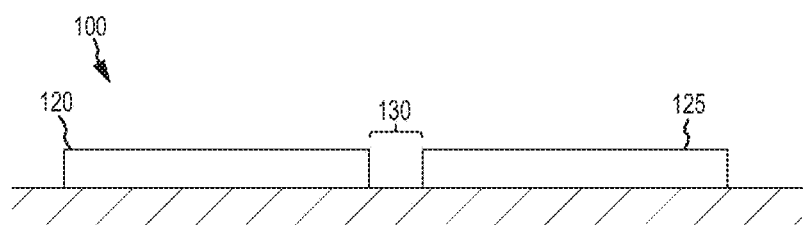
FIG. 1B illustrates a side view of the two substrate sections forming a gap of FIG. 1A, in accordance with the present disclosure.

FIG. 1B illustrates a side view of FIG. 1A of the two substrate sections forming a gap. Similar to FIG. 1A, FIG. 1B is a schematic diagram illustrating the first section of substrate 120 joined to a second section of substrate 125 to form a gap 130. The elements in FIG. 1B are provided for explanatory purposes only and not of limitation. Additionally, FIGS. 1A and 1B are not to scale. The first and second piece of materials 120 and 125 respectively, may be the substrates as discussed herein. Further, in one example, the gap 130 between the first and second pieces of material 120 and 125 may be on the order of approximately tens of microns. Moreover, as shown in FIG. 1B, the first and second pieces of substrate or material may have an edge profile of approximately ninety degrees. An edge profile of approximately ninety degrees or undercut with respect to the front or top surface of the substrate sections may be desirable. This edge profile may allow the front or top surfaces of the substrate sections to be as close as possible to one another, thus resulting in a small a gap as possible.

Figure 1C:
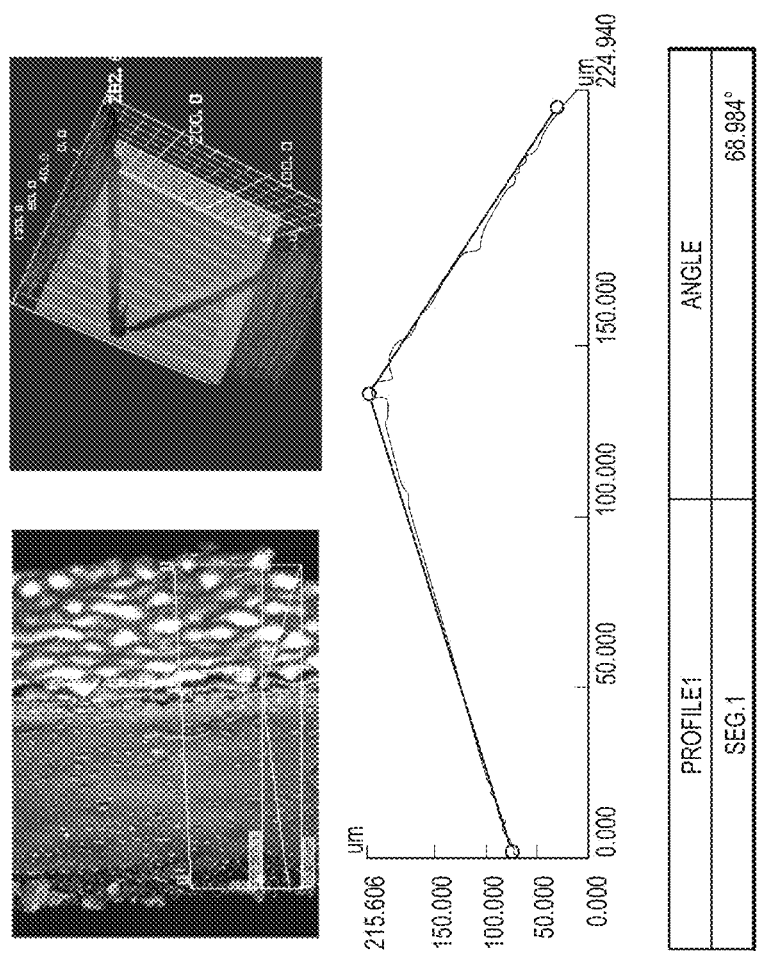
FIG. 1C illustrates a microscope photo illustrating a laser slit edge profile, showing results from an exemplary laser slitting process, in accordance with the present disclosure.

FIG. 1C shows a microscope photo illustrating a laser slit edge profile, showing results from an exemplary laser slitting process. The fit to the data shows that the wall is smooth and is undercut by an angle of approximately 21°, ensuring that there is substantially no mechanical interference when the substrates are butted together.

Mechanical interference between two adjacent sections of slit substrate may become apparent in the case that the edge profile is not undercut. For example, it may be desirable to butt at least two sections of substrate together such that the two sections of substrate form as small a gap as possible when viewed from the top surface. However, if the sections of substrate are slit with edge profiles that are not undercut, the walls of the substrate material below the top surface may butt into one another, thus resulting in the appearance of a larger gap when viewed from the top surface of the substrates.

In another example, two sections of slit substrate with similar edge profiles of FIG. 1C may be butted up against one another. In this example, because the walls of substrate material are undercut with respect to the top surface, the top surfaces of the substrate sections may be proximate to one another and may result in the appearance of a small gap when viewed from the top. The small gap in this example may be smaller than the gap in the example in which the walls of the substrates have an edge profile that is not undercut with respect to the top surface. Stated differently, because the sections may be undercut, the walls of substrate material may not butt up against one another and may allow the top surfaces of the sections of substrate to butt up closer to one another.

Additionally, FIG. 1C illustrates that there is very little loss of functional material on the top surface. In the example of FIG. 1C, the substrate may have functional material on the top surface, and the functional material may allow reflection of light. Although there may be alternative methods for slitting the substrate of FIG. 1C, such as rotary shear slitting, these alternative methods may damage and/or chip the functional material off of the surface. The areas in which the functional material may be damaged may not effectively reflect light. Additionally, these damaged areas may result in the appearance of a larger gap when viewing the surface of at least two adjacent sections of substrate joined together to form a seam and/or gap as illustrated in FIG.1E. Similar to FIG. 1B, FIG 1E illustrates a schematic diagram of two substrate sections forming a gap. Further, FIG.1E illustrates a portion of screen 100, a first section substrate 120 joined to a second substrate section 125 to form a gap or seam 130. The two substrate sections 120 and 125 may be joined together by a backer 150. The backer may be adhered to the substrate sections via an adhesive 155. Alternatively, as illustrated in FIG. 1C, laser slitting may produce a slit edge without substantial loss of functional material from the top surface of the substrate. FIG. 1D illustrates a schematic diagram of two substrates 180 with undercut slit edges 190 forming a seam. Further FIG. 1D is one embodiment of and depiction of the undercut edge discussed with respect to FIG. 1C. FIGS 1D and 1E are not drawn to scale.

Figure 2:
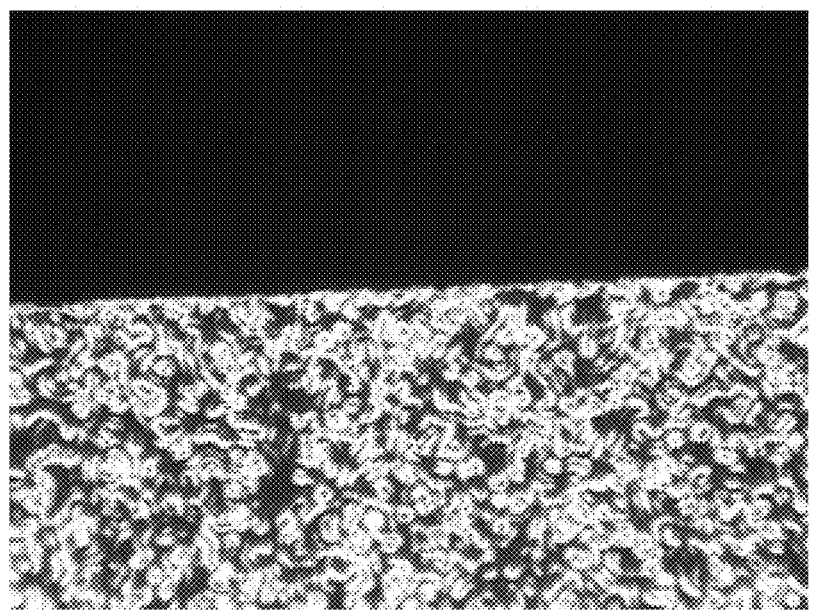
FIG. 2 illustrates another microscope photo of a laser slit edge profile, showing the top surface of the same laser slit material shown in FIG. 1, in accordance with the present disclosure.

FIG. 2 is another microscope photo illustrating a laser slit edge profile, showing the top surface of the same laser slit material shown in FIG. 1.

Initial acoustic transmission tests with raw substrates were done which verified the need for perforations regardless of material or thickness. Table 1 shows the acoustic attenuation for each sample at some select frequencies. The specific polymer and thickness may have incremental impact on transmission, but not in a substantially meaningful way. At the upper frequencies, perforations may be utilized as the attenuation may be far in excess of that allowable for a balanced audio experience.

TABLE 1

Acoustic attenuation for various materials/thicknesses.

| Sample | 200 Hz attenuation (db) | 1 kHz attenuation (db) | 16 kHz attenuation (db) |
|---|---|---|---|
| 375 μm PVC (screen material) | 2 | 13 | 35 |
| 88 μm PET | 0 | 2 | 20 |
| 125 μm PET | 0 | 4 | 26 |
| 175 μm PET | 1 | 7 | 29 |
| 250 μm PET | 1 | 9 | 32 |
| 250 μm PC | 1 | 8 | 31 |

In general, an issue with screen transmission, with or without perforations, is roll-off at higher frequencies. Concentrating on frequencies above 1 kHz allows testing in smaller dimensions, where the characteristic frequency of the sample can be an issue at lower frequency. Small sample size is convenient, since it allows samples to be generated using CNC milled hole arrays, and thus avoids the tooling cost of custom dies. Side-by-side testing was done to validate that 30 cm samples, with either 10 cm×10 cm arrays of 20 cm×20 cm arrays were sufficient for determining transmission at frequencies above 1 kHz.

A series of transmission measurements was done using 180 micron thick PET, with various pitch and hole diameters. Hole diameters of 0.5 mm, 1.0 mm, and 2.0 mm were used, with pitch selected to give consistent fill-factor. Hole area percentages of 12.6%, 8.7%, 4.9%, 3.1%, and 2.2% were used for CNC based samples.

TABLE 2

Acoustic attenuation versus array configuration.

| Hole Diameter (mm) | Percent Hole Area | 16 kHz Attenuation (db) |
|---|---|---|
| 2.0 | 12.6 | 4.2 |
| 0.5 | 8.7 | 3.5 |
| 1.0 | 8.7 | 4.8 |
| 2.0 | 8.7 | 7.2 |
| 0.5 | 4.9 | 6.0 |
| 1.0 | 4.9 | 9.0 |
| 2.0 | 4.9 | 12.0 |
| 0.5 | 3.1 | 9.8 |
| 1.0 | 3.1 | 12.0 |
| 2.0 | 3.1 | 15.8 |
| 0.5 | 2.2 | 12.2 |
| 1.0 | 2.2 | 15.2 |
| 2.0 | 2.2 | 18.3 |

Table 2 shows the important result that acoustic attenuation is not constant with percent hole area (or optical loss). Acoustic transmission gains are made by reducing the scale of the features, while maintaining constant percent hole area. Given that there is a maximum allowable 16 kHz acoustic attenuation of 6-8 db, this allows meeting the specification with a reduction in percent hole area. The most notable optical benefits of this scaling are that efficiency is increased, and perforations are less observable, either directly or as the result of interference fringes (moire).

From a manufacturability standpoint, die punches are practical down to dimensions of approximately 0.5 mm diameter, but preferably 1.0 mm for a robust process. In particular, tool wear becomes more significant as the die size falls below 1.0 mm. In order to drive to even lower percent hole areas, a different technology may be used. Laser hole drilling was investigated as a means of determining the limits in reducing percent hole area while meeting the appropriate high frequency transmission. Among the variables involved in optimizing this process include wavelength, energy per pulse, beam temporal profile (e.g., peak power), beam spatial profile, numerical aperture, and height positioning of the beam waist. Although the optimization may be dependent upon both substrate material and thickness, parameters have been identified to enable a "one-shot-per-hole" process for both 5-10 mil thick PC and PET.

Sample rolls were prepared using a 6" wide web with galvanometer steering of the laser. This produced roll-stock of material with fixed hole diameter (80 microns), and variable percent hole area on a square grid. In this instance, 2'×2' panels were made by seaming slit strips of 7-mil PC material using a reinforced butt joint adhesive process. The larger panels facilitate testing material at lower frequencies with more reliable results.

Experiments were done to determine the acoustic transmission spectrum in a quiet sound booth. The sample test size was 2'×2', hung from a horizontal bar via soft rubber bands and gripped with a pair of binder clips in the upper corners. Another pair of binder clips gripped the lower corners and supported a steel spreader bar via soft rubber bands. Microphones and speakers were both supported from tripods approximately 42.5" above the booth floor. Three microphones were used, each positioned directly behind the center of the sample. The distance of each microphone from the front of the screen was 1", 5", and 9", with the speaker mounted 30" behind the screen.

The transfer functions of each of the microphone's sound pressure per unit source random voltage as a function of frequency were measured with and without the screens in place. The difference in the sound pressure transfer functions, in dB, is reported as the sound level reduction. Each measurement was performed with 400 linear spectral averages with Hanning window applied and 75% overlap processing. Each sample was measured 4 times, with results averaged.

The samples tested are as follows: Three 7-mil polycarbonate substrate laser perforated silver screen samples with 1.1%, 2.6%, and 3% percent hole area, a sample of unperforated 7-mil PC silver screen, and a sample of conventional PVC silver screen coated on a 300 micron thick substrate. The PC-based screen was fabricated using a UV embossing process, followed by vacuum metallization of aluminum. The PVC silver screen was prepared using a conventional spray-painting process using ball-milled aluminum in a binder. The percent hole areas were measured on the functional side of the screen under the microscope, where the diameter is smallest. The holes were substantially conical in shape. In addition to these samples, un-perforated PC material was tested along with conventional PVC screen material as control samples.

Figure 3:
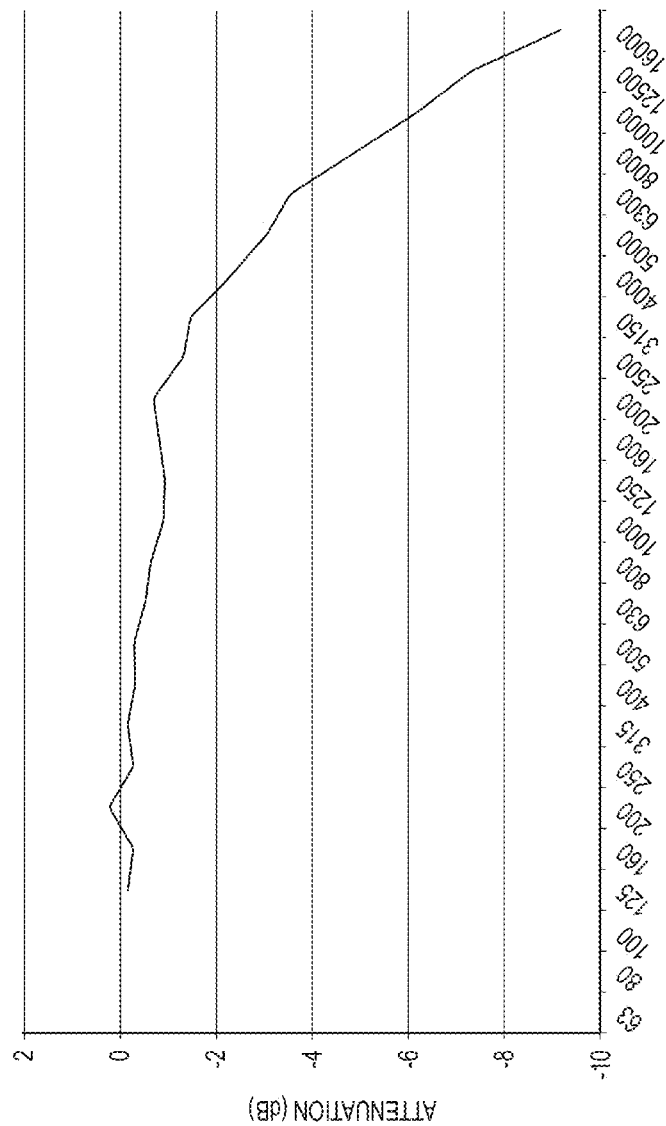
FIG. 3 is a graph of attenuation (dB) against ⅓ octave band (Hz) showing the transmission of a conventional perforated PVC silver screen, in accordance with the present disclosure.

FIG. 3 is a graph of attenuation (dB) against ⅓ octave band (Hz) showing the transmission of a conventional perforated PVC silver screen, which is consistent with previous results discussed. That is, the screen is nearly lossless below 1 kHz, with about 8 db of loss at 16 kHz.

Figure 4:
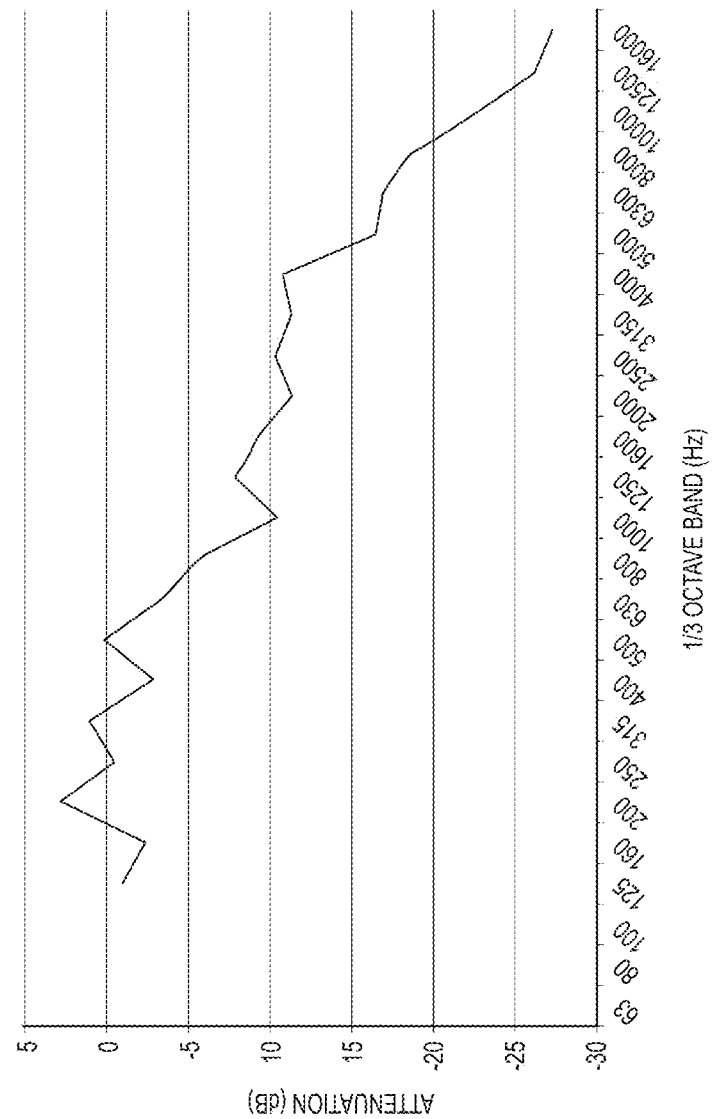
FIG. 4 is a graph of attenuation (dB) against ⅓ octave band (Hz) showing the transmission of unperforated 7 mil PC screen material, in accordance with the present disclosure.

FIG. 4 is a graph of attenuation (dB) against ⅓ octave band (Hz) showing the transmission of unperforated 7 mil PC screen material, which shows significant mid-range losses, and about a 27 db loss at 16 kHz.

Figure 5:
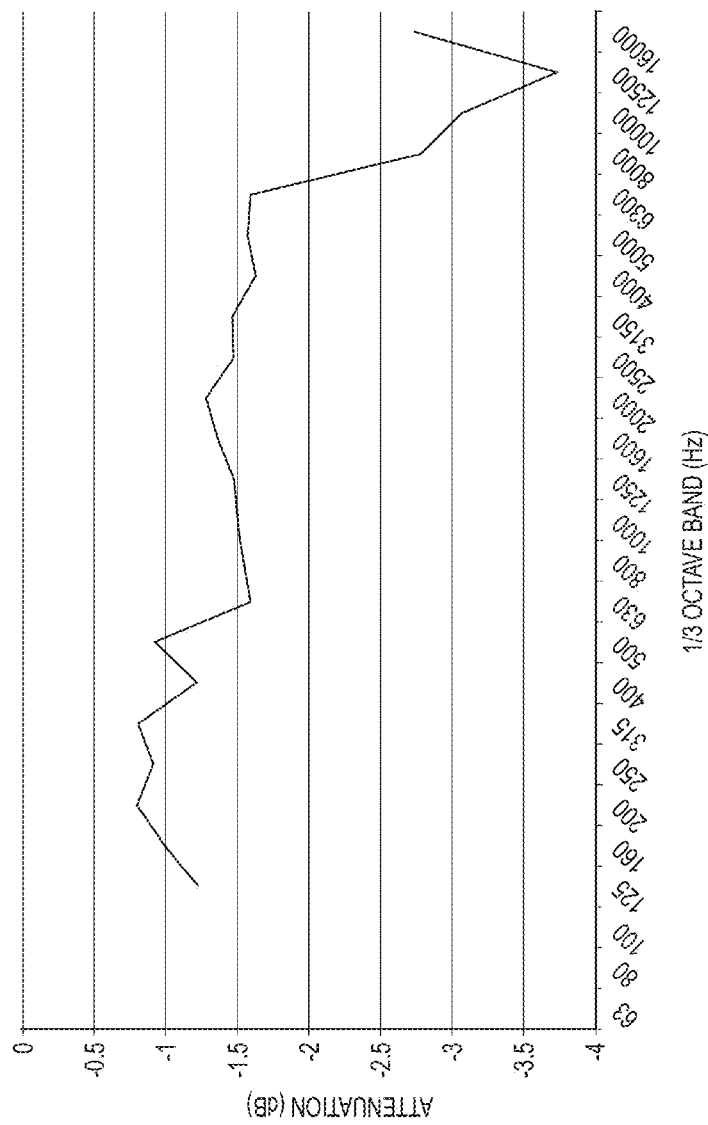
FIG. 5 is a graph of attenuation (dB) against ⅓ octave band (Hz) illustrating the transmission of 7 Mil PC screen material with a 3% hole area attenuation, in accordance with the present disclosure.

FIG. 5 is a graph of attenuation (dB) against ⅓ octave band (Hz) illustrating the transmission of 7 Mil PC screen material with a 3% hole area attenuation. Here, even with roughly half the percent hole area of standard screens (about 3%), the acoustic transmission is significantly better with smaller holes. There is almost no roll-off throughout the spectral range of interest (probably within experimental error), indicating that significantly lower percent hole-area is feasible.

Figure 6:
FIG. 6 is a graph of attenuation (dB) against ⅓ octave band (Hz) illustrating the transmission of 7 Mil PC screen material with a 2.2% hole area attenuation, in accordance with the present disclosure.

FIG. 6 is a graph of attenuation (dB) against ⅓ octave band (Hz) illustrating the transmission of 7 Mil PC screen material with a 2.2% hole area attenuation. This is the same screen material as illustrated in the graph of FIG. 5, but with lower percent hole area (2.2%). This spectrum shows an increase in mid-range losses, but with a 16 kHz loss that remains better than standard silver screens.

Figure 7:
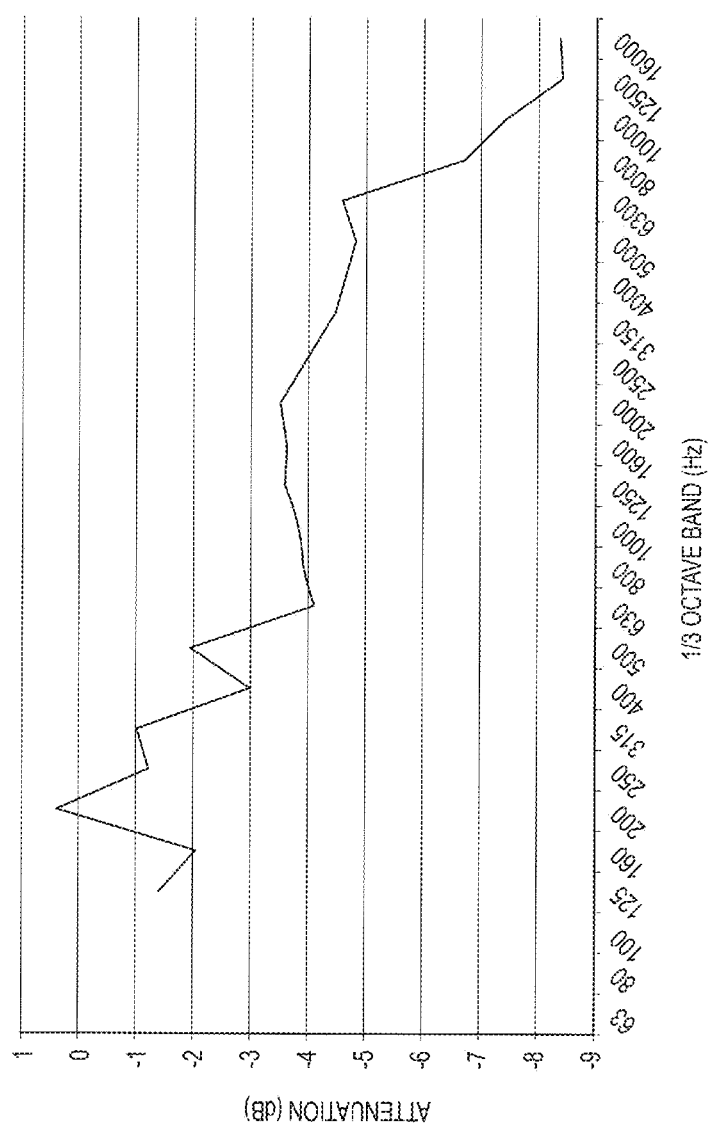
FIG. 7 is a graph of attenuation (dB) against ⅓ octave band (Hz) illustrating the transmission of 7 Mil PC screen material with a 1.1% hole area attenuation, in accordance with the present disclosure.

FIG. 7 is a graph of attenuation (dB) against ⅓ octave band (Hz) illustrating the transmission of 7 Mil PC screen material with a 1.1% hole area attenuation. This 1.1% hole area sample of FIG. 7 shows further losses in the mid-range of approximately 4 db, but with a 16 kHz loss that is similar to the conventional silver screen. Through equalization, the effects of the mid-range losses can be compensated, making a 1% hole area viable as a cinema product. The associated efficiency gain of 4-7% relative to conventional screens is extremely important in cinema, particularly in 3D presentation, which is currently light deficient.

An aspect of the present disclosure involves recognizing the beneficial relationship between high frequency acoustic transmission and percent hole-area when the feature sizes are scaled down. With an unperforated substrate, low frequency acoustic power transmission is possible because relatively long time-constants permit the screen to respond, setting air on the opposite side of the screen into motion. At higher frequencies, acoustic power is reflected at the screen substrate and relatively little power is transferred. When a perforation is made, it represents an acoustic short-circuit. Air imposes little resistance to shear, so within acoustic time constants of interest, there can be a significant tangential excursion of air molecules. This allows a perforation of small dimension to have an enormous impact on acoustic power transfer. Since the time constant is inversely proportional to the acoustic frequency, the tangential deflection naturally falls with increasing frequency. As such, the appropriate transmission at the cutoff frequency, for an array of small holes, can dictate the maximum allowed pitch.

In practice, the perforation diameter can become comparable, or even smaller than the substrate thickness. In this case, an additional parameter can come into play. In a severe situation where the perforation can be regarded a long narrow tube, the impact of viscous drag can become significant. The associated resistance to air flow through the tube can further reduce acoustic transmission, reducing the benefits of further scale reduction. In this limit of large aspect ratio (ratio of substrate thickness to perforation diameter), viscous drag can impede efficiency.

Figure 8:
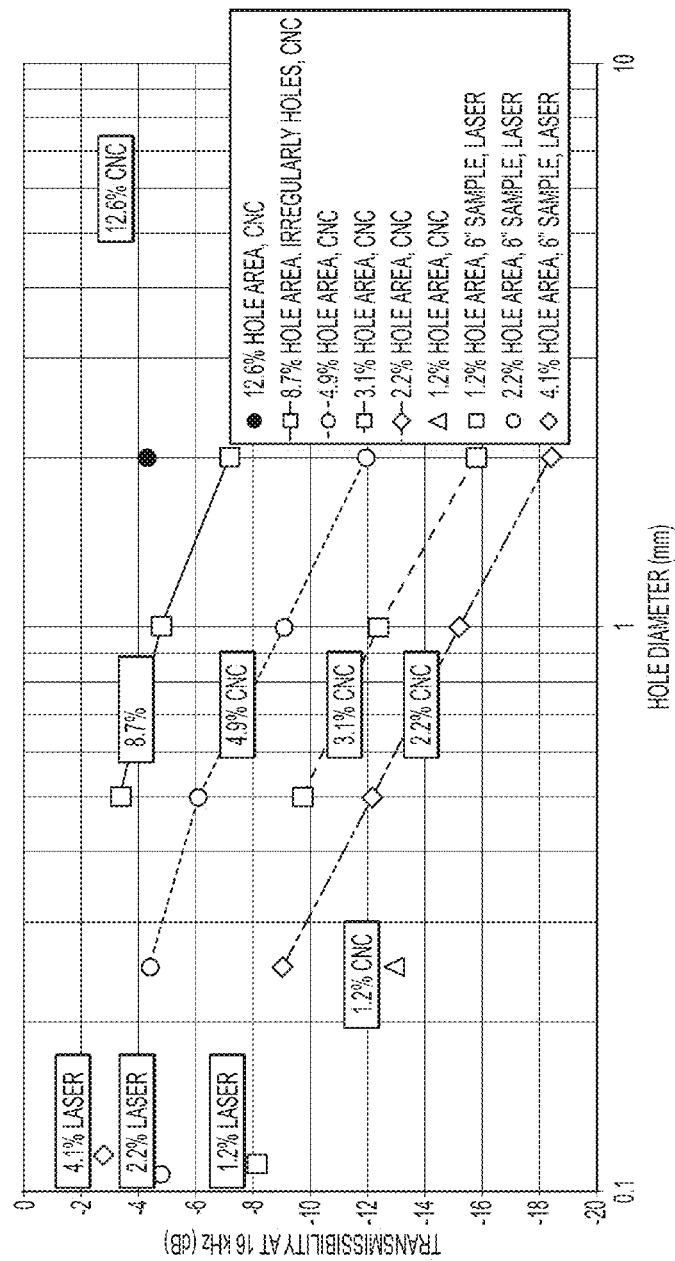
FIG. 8 is a graph of transmissibility at 16 kHz (dB) against hole diameter (mm), showing a comparison of high frequency acoustic transmissibility of laser drilled conical holes versus cylindrical CNC machined holes, in accordance with the present disclosure.

FIG. 8 is a graph of transmissibility at 16 kHz (dB) against hole diameter (mm), showing a comparison of high frequency acoustic transmissibility of laser drilled conical holes versus cylindrical CNC machined holes. As FIG. 8 shows, extrapolating the results of CNC drilled samples (which are substantially cylindrical holes) to lower percent hole area, produces a result that is fairly consistent with the measured laser drilled (conical hole) samples. As such, it is presumed that viscous drag calls for an aspect ratio exceeding approximately two before it has a very significant effect. Whether or not viscous drag is significant, conical holes may be used to obtain small hole diameter, as measured from the functional side. The process may use a large numerical aperture, such that the position of the beam waist relative to the substrate (in the normal direction) is critical.

Figure 9A:
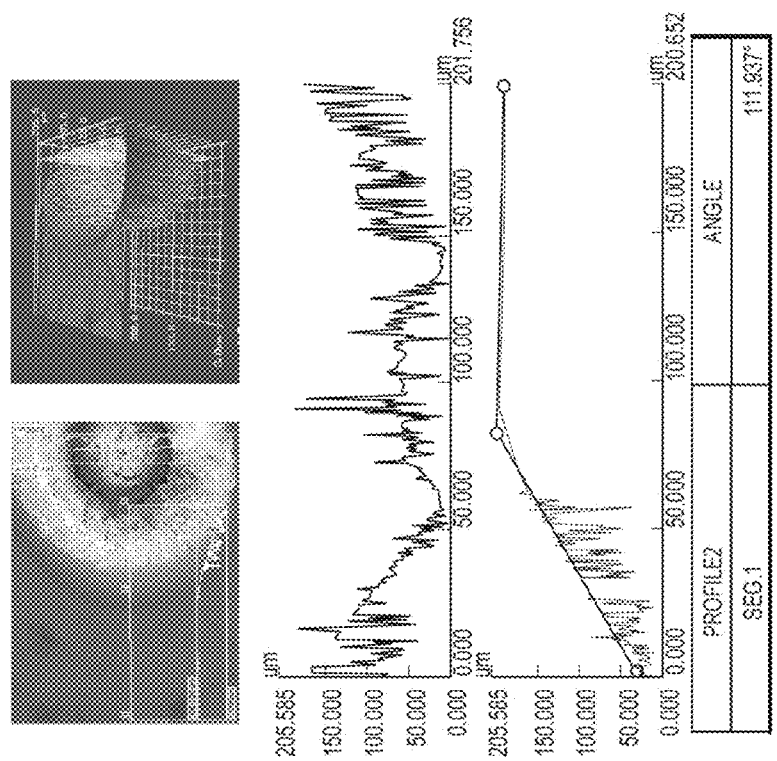
FIG. 9A illustrates the profile of a hole for the 80 micron openings that were tested, in accordance with the present disclosure.

FIG. 9A shows the profile of a hole for the 80 micron openings that were tested. The linear fit to the data indicates that the wall is approximately 22° off of vertical, giving a back-sidehole diameter of approximately 240 microns. This conical shape is effectively equivalent to thinning the substrate, thus decreasing the impact of viscous drag on the flow of acoustic power through the perforation. The hole profile illustrated in FIG. 9A may be desirable as the hole may be less visible from the front side of the substrate, but may include the advantages of a larger back-side hole diameter which may allow for the desired acoustical transparency. FIG. 9B illustrates a schematic diagram of a cross section of the conical perforation 910. Further in FIG. 9B, 920 may be the backside of a projection screen substrate and 930 may be the front side of the projection screen substrate. As previously discussed, the front side or top surface of the substrate may include a refelective functional material. FIG. 9B is not drawn to scale, but provided for illustrative and discussion purposes only.

Figure 10:
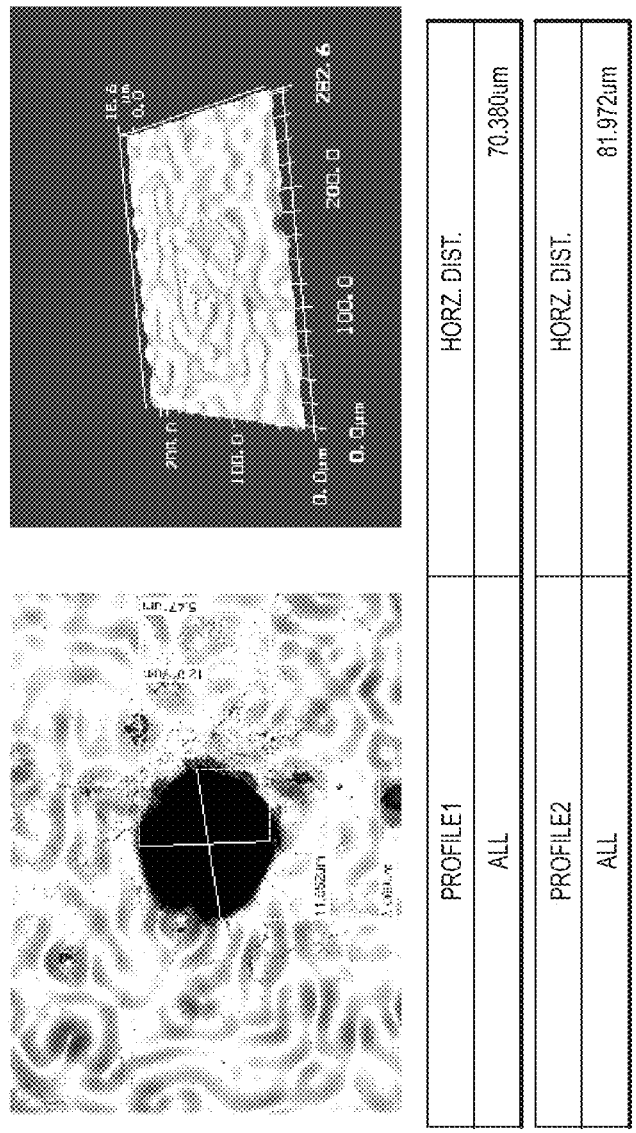
FIG. 10 is a schematic diagram showing the top view of a perforation from the same material, in accordance with the present disclosure.

FIG. 10 is a schematic diagram showing the top view of a perforation from the same material. It shows that the perforation diameter is approximately 80 microns, and that there is no loss or change in the functional coating in the area surrounding the hole that would be evidence of thermal damage.

It should be noted that, while the laser perforation and slitting process is particularly enabling for manufacturing polarization preserving screens using the seam-after-coating process, it is not limited to such realizations. In situations where it is necessary or beneficial to introduce openings or apertures in a substrate carrying an optically functional material, the teachings of the present disclosure is applicable. In the examples considered here, it is desirable to meet the appropriate acoustic transmission with minimal impact to reflected optical performance. The teachings of the present disclosure may similarly be applied, for example, when the objective is to allow spatially distributed access for optical sources in transmission, while substantially maintaining reflective performance.

It should be noted that embodiments of the present disclosure may be used in a variety of optical systems and projection systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Before proceeding to the disclosed embodiments in detail, it should be understood that the invention is not limited in its application or creation to the details of the particular arrangements shown, because the invention is capable of other embodiments. Moreover, aspects of the invention may be set forth in different combinations and arrangements to define inventions unique in their own right. Also, the terminology used herein is for the purpose of description and not of limitation.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A front projection screen, comprising:
   a first portion of material and a second portion of material, the first and second portion of material having a front side and a back side defining a front surface and a back of the front projection screen, respectively, wherein the first and second portions of material have microperforations less than approximately 300 microns, wherein the microperforations are defined through the front and back surfaces of the projection screen to allow the projection screen to maintain an approximate predetermined acoustical transmission range;

wherein each of the first and second portions of the material have an undercut edge profile with respect to the front side of the material.

2. The front projection screen of claim 1, wherein the first and second portions of material further comprise an approximate predetermined optical fill factor.

3. The front projection screen of claim 2, wherein the predetermined optical fill factor further comprises a perforation area with an approximate area range of 1%-3% of the optical surface of the total area of the first and second portions of material.

4. The front projection screen of claim 1, further comprising a seam, wherein the first and second portions of material are joined together to form the seam.

5. The front projection screen of claim 4, wherein the first and second portions of material are joined with little to no machine direction alignment.

6. The front projection screen of claim 1, wherein at least some of the microperforations further comprise an approximately conical shaped cross section.

7. The front projection screen of claim 1, wherein the perforated first and second portions of material have a substantially homogeneous appearance.

8. The front projection screen of claim 1, wherein the undercut edge profile is achieved with laser slitting.

9. The front projection screen of claim 1, wherein the microperforations are in the approximate size range of 50-300 microns on the front surface.

10. The front projection screen of claim 1, further comprising a pitch pattern on the first and second portions of material, wherein the pitch pattern comprises an increasing pitch between microperforations, wherein the pitch between microperforations gradually increases from the center of the material to the edge of the material, wherein the increase in pitch is substantially visually imperceptible.

11. A method for producing an acoustically transmissive substrate, comprising:

providing a substrate having an optical surface and an undercut edge with respect to the optical surface;

perforating the substrate to achieve a predetermined acoustical transmission range for the substrate and to achieve a predetermined optical fill factor for the substrate, wherein the perforations on the substrate are defined through the optical surface and a back surface of the substrate and are less than approximately 300 microns.

12. The method for producing an acoustically transmissive substrate of claim 11, wherein perforating further comprises laser perforating.

13. The method for producing an acoustically transmissive substrate of claim 12, wherein laser perforating further comprises single shot laser perforating.

14. The method for producing an acoustically transmissive substrate of claim 11, wherein perforating further comprises locating the perforations on the substrate in a periodic array.

15. The method for producing an acoustically transmissive substrate of claim 11, wherein perforating further comprises locating a first set of perforations on the substrate in a periodic array and locating a second set of perforations on the substrate randomly.

16. The method for producing an acoustically transmissive substrate of claim 11, wherein perforating further comprises locating the perforations in a random pattern on the substrate.

17. The method for producing an acoustically transmissive substrate of claim 11, wherein perforating further comprises locating the perforations in a partially random pattern on the substrate.

18. The method for producing an acoustically transmissive substrate of claim 11, wherein perforating further comprises locating perforations on the substrate without regard to registration of the perforations with respect to the edge of the substrate.

19. The method for producing an acoustically transmissive substrate of claim 11, wherein the measurement of the perforations on a front side of the substrate are in the approximate size range of 50-300 microns.

20. The method for producing an acoustically transmissive substrate of claim 11, wherein a cross section of the perforations is approximately conical.

21. A front projection screen, comprising:

a first portion of a material and a second portion of material, wherein the first and second portions of material have a front screen side configured to reflect image light for viewing and each of the first and second portions of the material have an undercut edge profile with respect to the front screen side of the material.

22. The front projection screen of claim 21, wherein the undercut edge profile is achieved with laser slitting.

* * * * *